United States Patent
Nishiguchi et al.

(10) Patent No.: US 8,068,166 B2
(45) Date of Patent: Nov. 29, 2011

(54) ZOOM CAMERA WITH MANUAL FOCUS FUNCTION

(75) Inventors: Tomoaki Nishiguchi, Yokohama (JP); Hideharu Oono, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 225 days.

(21) Appl. No.: 12/260,115

(22) Filed: Oct. 29, 2008

(65) Prior Publication Data

US 2009/0109299 A1   Apr. 30, 2009

(30) Foreign Application Priority Data

Oct. 31, 2007 (JP) ................................. 2007-282623

(51) Int. Cl.
*H04N 5/232* (2006.01)
*H04N 5/235* (2006.01)

(52) U.S. Cl. ..................................... 348/347; 348/229.1

(58) Field of Classification Search ............... 348/229.1, 348/240.99, 347
See application file for complete search history.

(56) References Cited

U.S. PATENT DOCUMENTS

| | | | | |
|---|---|---|---|---|
| 4,687,344 | A * | 8/1987 | Lillquist | 374/124 |
| 2005/0083419 | A1 * | 4/2005 | Honda et al. | 348/244 |
| 2005/0099515 | A1 * | 5/2005 | Tsuruoka | 348/241 |
| 2007/0024720 | A1 * | 2/2007 | Awazu | 348/223.1 |

FOREIGN PATENT DOCUMENTS

| | | |
|---|---|---|
| JP | 9-73115 | 3/1997 |
| JP | 2000-101899 | 4/2000 |
| JP | 2000-275695 | 10/2000 |
| JP | 2003-232986 | 8/2003 |
| JP | 2003-248171 | 9/2003 |
| JP | 2004-287183 | 10/2004 |
| JP | 2005-345520 | 12/2005 |
| JP | 2006-189571 | 7/2006 |
| JP | 2008-116593 | 5/2008 |

OTHER PUBLICATIONS

Office Action issued in Japanese Patent Application No. 2007-282623 on Jun. 7, 2011.

* cited by examiner

*Primary Examiner* — Lin Ye
*Assistant Examiner* — Amy Hsu
(74) *Attorney, Agent, or Firm* — Antonelli, Terry, Stout & Kraus, LLP.

(57) ABSTRACT

A zoom camera having enhanced focusing stability during high magnification zooming under environments of high temperatures or low temperatures. When the zoom camera performs zoom-in operations in an environment of high or low temperatures, aperture control is added as the zoom magnification becomes higher and the temperature becomes higher or lower whereby the depth of field is made deeper to assure the presence of a range with good focusability.

4 Claims, 5 Drawing Sheets

ZOOM CAMERA WITH MANUAL FOCUS FUNCTION

INCORPORATION BY REFERENCE

The present application claims priority from Japanese application JP 2007-282623 filed on Oct. 31, 2007, the content of which is hereby incorporated by reference into this application.

BACKGROUND OF THE INVENTION

The present invention relates to exposure control of high-magnification zoom cameras.

Zoom cameras have generally two major types of lenses. One of them is a zoom lens which determines the size of an image to be formed on a charge-coupled device (CCD) image pickup plane. The other is a focus lens which performs focus adjustment of an image being formed on the CCD image pickup plane. Regarding the focus adjustment of the focus lens during zoom lens magnification changing operations, there are two kinds of functions: automatic focus function, and manual focus function.

In the auto-focus function, at the time of an operation for changing the zoom lens magnification, a focus lens position is automatically determined in accordance with a target subject or object to be photographed in such a way that an image being formed on CCD image pickup plane comes into focus at all times. On the other hand, the manual focus function is such that trace curve information indicative of the relationship of a zoom magnification and a moved distance of the focus lens is stored and, based on such trace curve information, the focus lens position is adjusted. This trace curve has temperature dependency, and there are many portions which are dependent on the temperature characteristics of a housing of the zoom lens, called the lens barrel.

One example of prior known techniques for improving the trace curve's temperature dependency is disclosed in JP-A-2003-248171, which recites therein, as its objective, "in a variable magnification image sensing device, unwanted variation or fluctuation of an image formation position occurring due to a temperature change is lessened while permitting the use of a plastic lens, thereby retaining good focusing performance" and recites as the solving means "a variable magnification image sensor device having a four-group lens configuration, wherein the device has in a third group a plastic lens 3 which has positive refracting power with a negative temperature coefficient of refractivity and a predetermined focal distance, a first support lens barrel L1 which holds together the third lens group and the first lens group, and a second support barrel L2 which holds together the third lens group and an image pickup element 5, characterized in that a variation of the image formation position due to temperature changes of the lens groups is countervailed or "cancelled" by a variation amount of imaging position due to an extension/shrink amount based on a temperature change of the support barrel having a prespecified linear expansion coefficient."

In addition, one prior art concerning the improvement of focus adjustment method of the manual focus function is found in JP-A-2006-189571, which discloses as the object "if there is an error in distance information and actual focus position at the time of manual focusing, there is a case where accurate focusing becomes impossible, in particular, at the distance of a settable range end; however, even in this situation, the best possible focus state is obtained without bothering the user with troublesome works" and recites as the solving means "an image sensor device having manual focus means, which has auto-focus means for automatically obtaining a focus position from the periphery of a presently set focus position, wherein the autofocus means performs focus control when the focus position is set at a predetermined position."

SUMMARY OF THE INVENTION

In recent years, a growing need is felt for advanced surveillance cameras with a built-in high-magnification zoom lens for visually monitoring far distant scenes by high quality video images, for the purpose of long-range monitoring or "watchdog" of airports or harbors or accident prevention surveillance of rivers or else. To meet the need, high magnification zoom lenses are used, such as a 24-fold (24×) zoom lens or a 35× zoom.

In the manual focus function using such high-power zoom lens, it sometimes happens that mere use of the traditionally used trace curve fails to prevent occurrence of out-of-focus or defocus at high temperatures or low temperatures. Theoretically, the defocus is preventable by measuring in advance the entire temperature characteristics of the trace curve and then letting the measured data be internally stored in a camera and next performing focus control. However, the technique for performing focus control by measuring for storage every temperature in accordance with variation of the individual of mass-production products is too costly and thus is not a realistic approach.

On the other hand, surveillance cameras of the type performing unmanned operations suffer from difficulties in setting the focus position periphery as suggested in JP-A-2006-189571.

It is therefore an object of this invention to stabilize the image quality by significantly alleviating temperature-caused defocus of a high-power zoom camera. To this end, the present invention utilizes the phenomenon that a focused state obtainable range (i.e., depth of field) becomes deeper by stopping down the diaphragm. Namely, instead of fully opening the diaphragm in a high-power zoom lens at high or low temperatures, the aperture value is enlarged or increased to some extent to thereby increase the gain magnification determined by an automatic gain control (AGC) circuit so as to significantly alleviate temperature-caused defocus of a high-power zoom camera.

To attain the foregoing object, the present invention employs, as one example, the configuration that is defined in the appended claims. More precisely, at the time of application of the high-power zoom using the manual focus function, diaphragm aperture control is added at high or low temperatures in such a way as to make the depth of field deeper, thereby letting it have a focus margin or allowance.

According to this invention, it is possible to reduce defocus of a sensed image to thereby achieve stabilization of the image quality.

Other objects, features and advantages of the invention will become apparent from the following description of the embodiments of the invention taken in conjunction with the accompanying drawings.

DETAILED DESCRIPTION OF THE EMBODIMENTS

Figure 1:
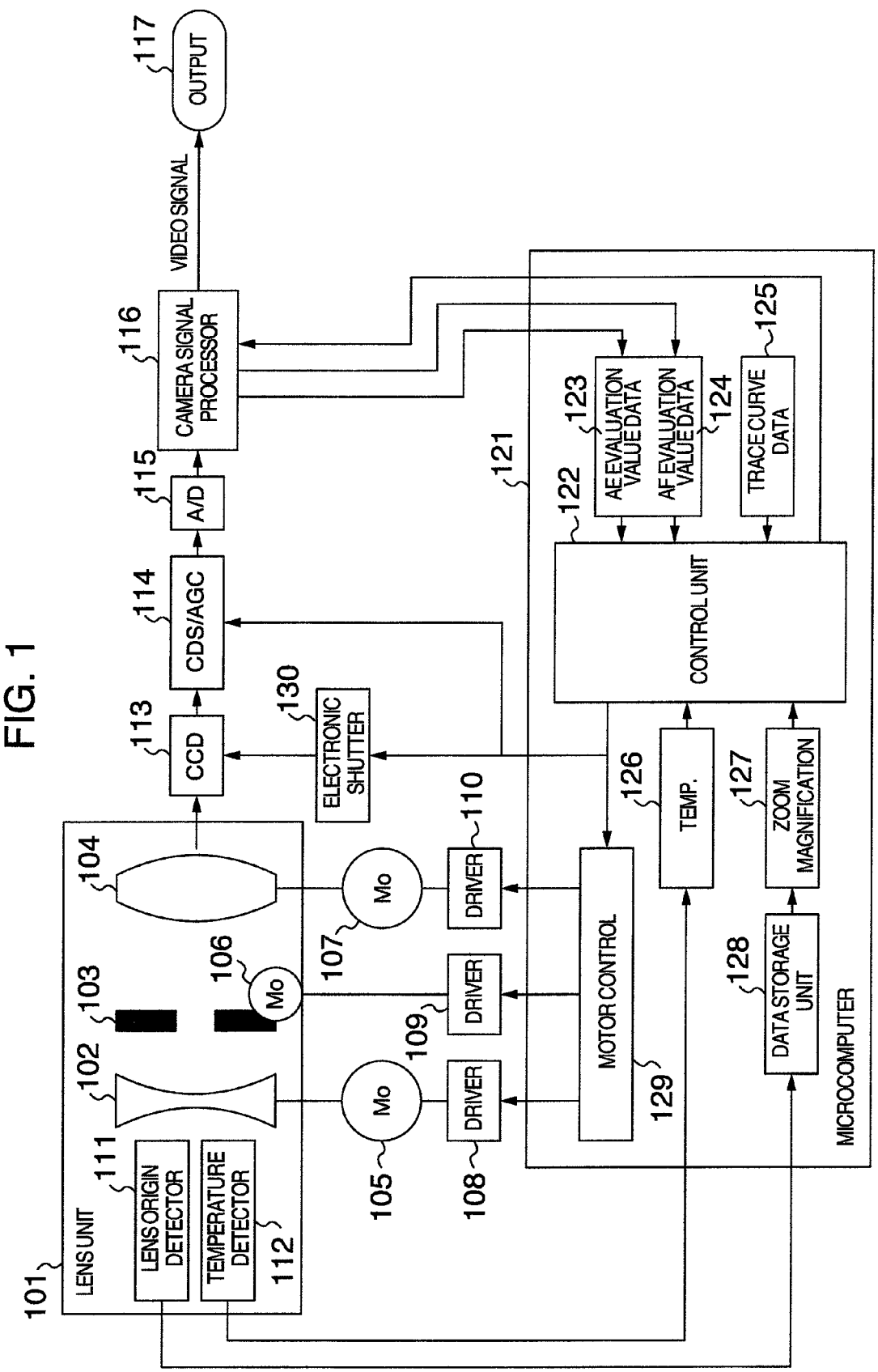
FIG. 1 is a diagram showing a configuration of a zoom camera in accordance with one embodiment of this invention.

A currently preferred embodiment of this invention will be described with reference to FIG. 1 below. FIG. 1 is a block diagram showing an exemplary configuration of a zoom camera in accordance with one preferred embodiment of this invention.

In FIG. 1, a lens unit 101 is made up of a variator lens group 102 which performs magnification changing of light rays coming from a photographic subject or object, a diaphragm 103, a focus lens group 104 which has focus adjustment function, a variator lens group 102, an absolute position detector 111 which detects absolute positions of the variator lens group 102 and focus lens group 104, such as a photointerrupter or the like, a temperature detector 112 and others.

Detection information which indicates a detection result of the absolute position detector 111 of the lens unit 101 is stored in a data storage unit 128 of a microcomputer 121.

After having photoelectrically converted the light rays from the target object which has passed through the lens unit 101 at an image pickup element 113, such as a charge-coupled device (CCD) image sensor or like imagers, it is amplified by an automatic gain control (AGC) circuit 114 up to an optimal level and then is converted by an analog-to-digital converter (A/DC) circuit 115 into a digital signal, which is input to a camera signal processing circuit 116.

At the camera signal processor circuit 116, the signal is converted to a standard television (TV) signal 117 (video signal) and is then output therefrom. This circuit also outputs auto-focus (AF) information and auto-iris or auto-exposure (AE) information to the microcomputer 121.

In the microcomputer 121, the AE information and AF information are converted to AE evaluation value data and AF evaluation value data by an AE data processing program 123 and AF data processing program 124, respectively. In a control unit 122 within the microcomputer 121, based on the AE evaluation value data and AF evaluation value data as well as detection information of the absolute position detector 111 being stored in the data storage unit 128, temperature information of the temperature detector 112, zoom ratio information, and information of a trace curve data storage unit, a motor control unit 129 generates motor drive control information to thereby control electrical motors with respect to the variator lens group 102, camera diaphragm 103 and focus lens group 104; simultaneously, the control unit performs control of an electronic shutter 130 and amplifier 114.

The motor drive control information of the motor control unit 129 is supplied to a zoom motor driver 108 which drives a zoom motor 105, a diaphragm motor driver 109 which drives a diaphragm motor 106, and a focus motor driver 110 that drives a focus motor 107, for performing driving of the variator lens group 102 toward a telephoto or wide-angle direction, setting of the optimum aperture value, and focus adjustment of the focus lens group 104 based on the trace curve.

By switching a shutter speed of the electronic shutter 130 and increasing or decreasing an exposure time period with respect to the image pickup element, such as CCD or else, light amount adjustment of an image being focused on a photosensitive plane of the image pickup element 113 is performed. Further, pseudo-light amount adjustment is also performed by setup of the AGC circuit 114.

Figure 2:
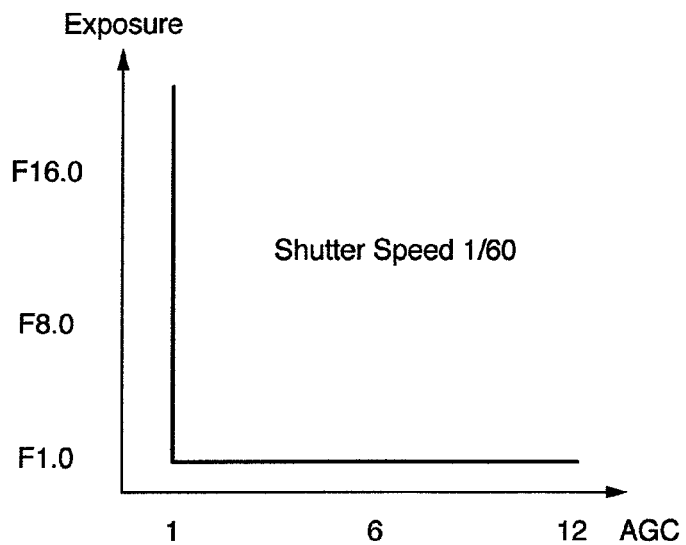
FIG. 2 is a diagram graphically showing a relation of exposure value versus gain magnification of an amplifier in one prior known zoom camera.

FIG. 2 shows a relationship of aperture value of diaphragm 103 versus gain of AGC circuit 114 in a traditional aperture control procedure. By letting the shutter speed be fixed at 1/60, the diaphragm is gradually opened with a decrease in light amount from the photographic object (in the direction of from Exposure F16 to F1.0 along the vertical axis of FIG. 2) so that an output of the image pickup element 113 is controlled to be kept constant, with the AGC circuit 114 being fixed in gain magnification. After the aperture reaches its full-open state (F-number 1.0) as a result of a further decrease in amount of light from the target object, the output of image pickup element 113 decreases; so, the gain magnification of AGC circuit 114 is increased to thereby cause the output to the A/DC circuit 115 to stay constant. In reality, when performing zooming to higher level of magnification, the light amount from the object decreases as a narrow viewing field is expanded; thus, control of the diaphragm 103 and AGC circuit 114 is being performed as shown in FIG. 2. This becomes the optimum control in cases where a zoom magnification 127 is low magnification and where a lens temperature 126 is room temperature.

Figure 3A:
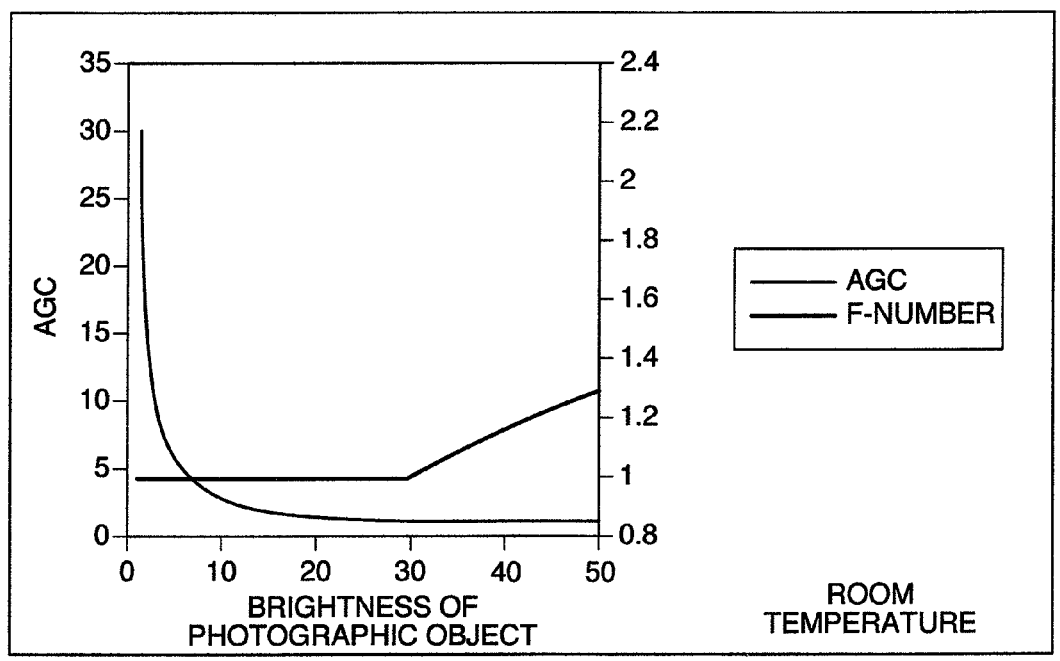
FIG. 3A is a graph showing a relation of exposure value versus gain magnification of an amplifier at room temperature in a zoom camera embodying the invention.
Figure 3B:
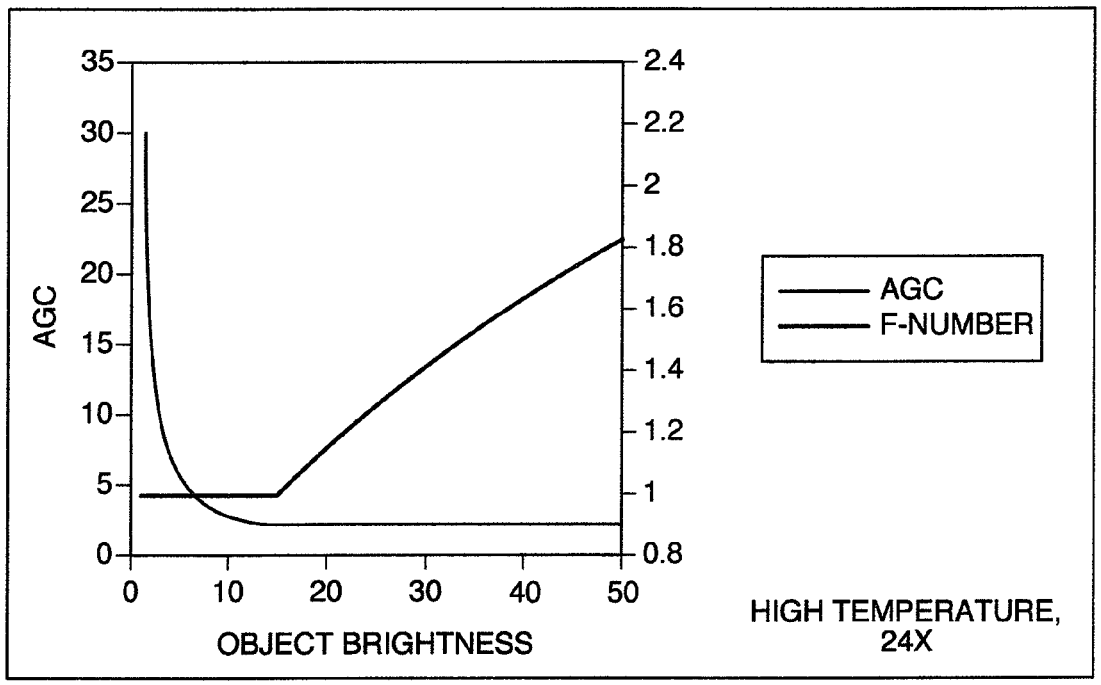
FIG. 3B is a graph showing a relation of exposure value versus gain magnification of amplifier in the zoom camera embodying the invention in the case of using a 24-fold (24×) zoom lens at high temperatures.
Figure 3C:
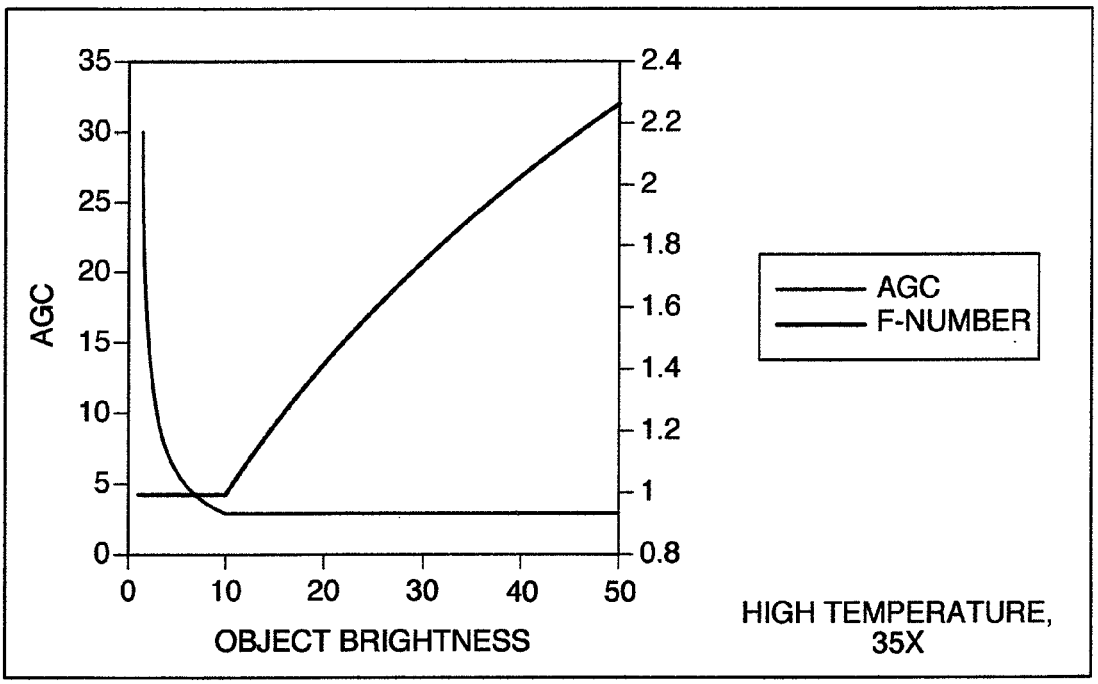
FIG. 3C is a graph showing a relation of exposure value versus gain magnification of amplifier in the zoom camera embodying the invention in the case of using a 35× zoom lens at high temperatures.

FIGS. 3A to 3C are graphs each showing a relation of diaphragm 103 and AGC circuit 114 in this invention. At room temperature, the same exposure control as that of FIG. 2 is performed. At high temperatures with a high level of magnification, the control unit 122 of the microcomputer 121 performs control in such a way as to satisfy the following equation:

$$x \times A \times S \times F^{-2} = \text{constant} \quad (1)$$

where x is the AE information as read out of the AE data readout program 123, A is the gain magnification of AGC circuit 114, S is electronic shutter speed (sec.) and F is the F-number (aperture value).

FIG. 3A shows a relation of F-number (aperture) and gain magnification of AGC circuit 114 at room temperature, wherein when the photographic object is bright, exposure control is performed by setting the gain magnification A at 1 (A=1) and the F-number (aperture) in such a manner as to satisfy the above-noted Equation (1) at a shutter speed of 1/60 (sec). As the target object becomes darker, the F-number (aperture) is reduced by opening the diaphragm. When the brightness of the object is lowered to 30 or below, resulting in the F-number being equal to a value corresponding to the full-open state, the gain magnification A is increased to compensate for light amount deficiency to thereby cause the input to the A/DC circuit 115 to stay constant.

FIG. 3B shows a relation of F-number (aperture) and gain magnification of AGC circuit 114 at a high temperature (60° C.) in the case of zoom magnification of 24-fold (24×), wherein even when the photographic object is bright, the gain magnification A is doubled to stay at A=2 with the shutter speed being kept at 1/60 (sec); then, the F-number (aperture) is adjusted in such a way as to be equal to half of the light amount of the object which reaches the image pickup element. As a result of this, aperture control becomes possible until the object brightness becomes equal to 15, resulting in the depth of field becoming deeper by stopping down the diaphragm. Thus, out-of-focus or defocus becomes rarely occurrable.

FIG. 3C shows a relation of F-number (aperture value) and gain magnification of AGC circuit 114 at a high temperature of 60° C. in the case of zoom magnification of 35-fold (35×), wherein even when the shooting object is bright, the gain magnification A is set at 3 (A=3) while letting the shutter speed be kept at 1/60 (sec); then, the F-number (aperture) is adjusted to ensure that the light amount of the object which reaches the image pickup element becomes one third (1/3). As a result, aperture control becomes possible until the object brightness becomes 10, resulting in the depth of field becoming further deeper owing to stopping down of the diaphragm. Thus, defocus becomes hardly occurrable.

It should be noted that although in the above-stated case the value of AGC circuit 114 is set at AGC=1, 2, 3, the optimum value is different in a way depending upon various circumstances of noises applied to the zoom camera.

Figure 4:
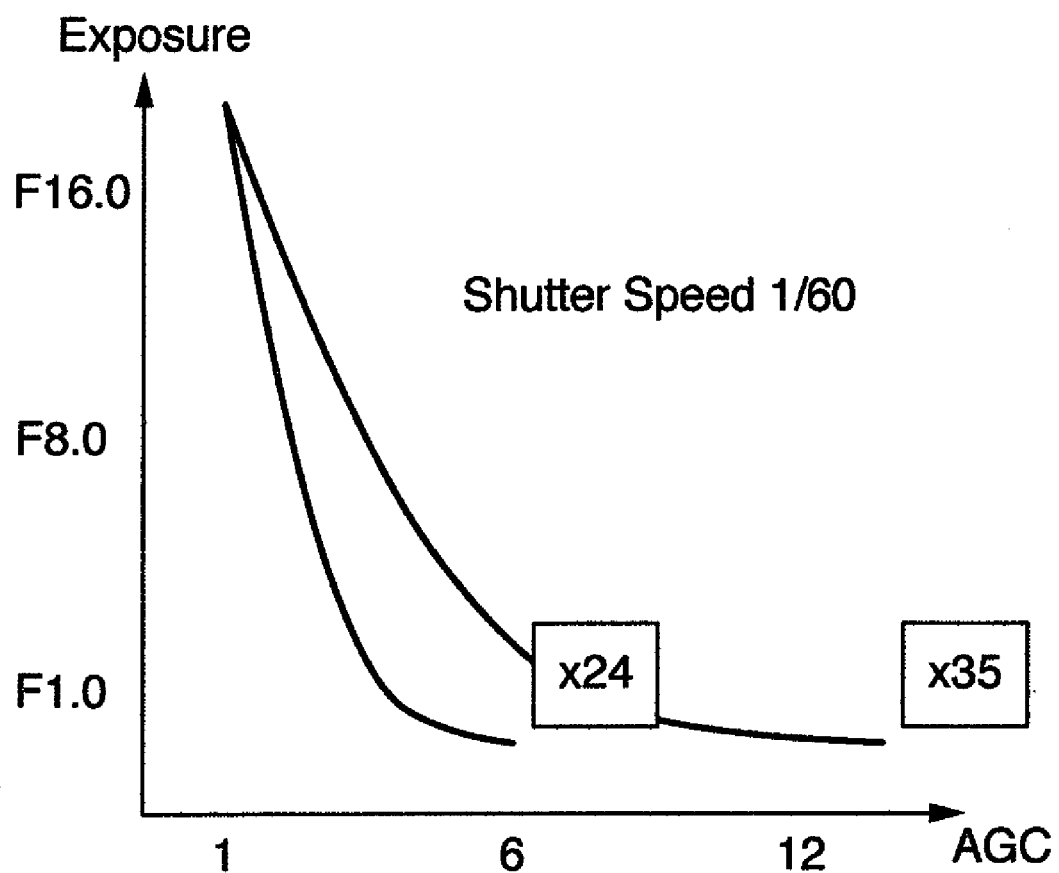
FIG. 4 is a graph showing a relation of exposure value versus gain magnification of an amplifier in a zoom camera also embodying the invention.

FIG. 4 shows a relation of diaphragm 103 and AGC circuit 114 in accordance with one embodiment of this invention. In the prior art of FIG. 2, the gain magnification of AGC circuit is increased after the aperture value becomes the full-open value (F=1.0). In contrast, in the embodiment of FIG. 4, the gain magnification of AGC circuit is increased before the aperture value becomes the full-open value, and the correlation of the aperture value and the gain magnification of AGC circuit is specifically controlled by forcing the x value (AE information as read from the AE data readout program 123) in the above-stated Equation (1) to stay constant, with the shutter speed S being set to a fixed value—here, S=1/60 sec. In addition, as the zoom magnification increases from 24× to 36×, the aperture value is made larger to thereby enlarge the effect of the depth of field.

Figure 5:
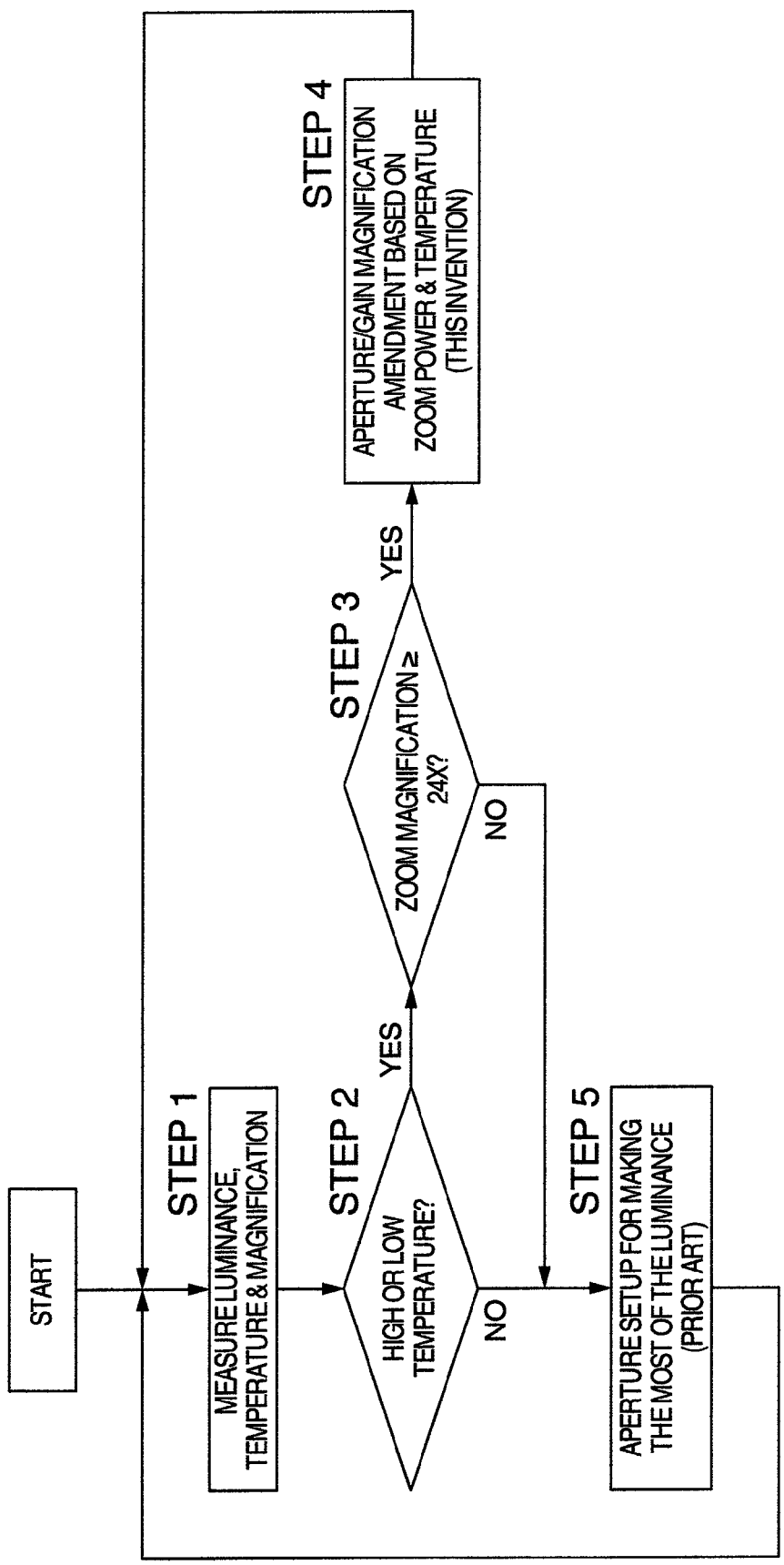
FIG. 5 is a diagram showing a flow chart of control procedure of exposure and gain magnification of an amplifier in accordance with an embodiment of this invention.

FIG. 5 shows a flowchart of a system procedure for setting up the F-number (aperture value) and the gain magnification of AGC circuit 114 shown in FIGS. 3A-3C.

At a step 1, the control unit of the microcomputer 121 acquires AE evaluation value data, temperature information of the temperature detector 112, and zoom magnification information.

At a step 2, an attempt is made to determine whether the temperature information of the temperature detector 112 falls within a predetermined temperature range (e.g., 0° C.≦T≦60° C.). If it is within the temperature range, the procedure goes to a step 5. If it is out of this range, then proceed to a step 3.

At the step 3, a decision is made to determine whether the zoom magnification is 24× or greater. If it is less than 24×, then proceed to the step 5. If it is more than or equal to 24× then go to a step 4.

At the step 4, the detected temperature and the zoom magnification are used to obtain the preset gain magnification of AGC circuit 114 and aperture value. Here, the camera diaphragm is stopped down more strongly as the lens becomes higher in temperature and the diaphragm is stopped down more strongly as the lens becomes larger in zoom magnification. Regarding the diaphragm squeezing rate, it becomes a trade-off with noises existing in electrical circuitry. If such noises are large in amount, it is impossible to stop down the diaphragm so significantly; however, if noises are less in amount, the diaphragm may be stopped down relatively strongly.

At the step 5, in view of the fact that, as far as the zoom magnification range of from 1× (real image size) to 24× is concerned, appreciable defocusing does not take place even without intentional diaphragm stopping down, even where dark photographic object is subjected to image pickup in a similar way to the prior art control, there is employed the traditionally implemented technique with the use of the gain magnification of AGC circuit 114 and the aperture value for making the most of the light rays coming from the photographic object or subject, which reach the image pickup element.

According to this control scheme, even in the case of performing high-magnification zooming at high temperatures or low temperatures, it becomes possible to uniformly absorb unwanted variation or fluctuation of the temperature characteristics of the trace curve because of the fact that the depth of field is uniformly made deeper without having to depend upon irregularities of the trace curve's temperature properties. In other words, even where the focussing point is deviated from the target object or subject of interest to its near side or far side, it is possible to take the focus thereon although a temperature-caused change in positional relationship of the zoom lens and the focus lens exhibits random variability.

On the other hand, the control scheme has a drawback that strong use of the gain magnification of AGC circuit 114 would result in an increase in noise; however, this is improvable by improvement of electrical circuit parts or components of the zoom camera.

As apparent from the foregoing description, according to this invention, by stopping down the diaphragm 103 relatively strongly, the depth of field is made deeper to eliminate mismatch of the trace curve and the lens properties, thereby preventing defocus. This achieves increased stability of the image quality.

In the foregoing some preferred embodiments of this invention have been explained. According to this invention, in the event of high-power zooming, such as 24×, 35×, etc., it is possible to reduce defocus of a sensed image at high or low temperatures. This makes it possible to achieve enhanced stability of the image quality.

It should be further understood by those skilled in the art that although the foregoing description has been made on embodiments of the invention, the invention is not limited thereto and various changes and modifications may be made without departing from the spirit of the invention and the scope of the appended claims. For example, the embodiments are the ones that have been explained in order to explain in detail the principles of this invention, and the invention should not always be limited to those which comprise all of the arrangements as disclosed herein.

The invention claimed is:

1. A zoom camera with manual focus function for performing focus adjustment by using a trace curve, said camera comprising:
   an optical system having a zoom adjustment mechanism, an aperture adjustment mechanism and a focus adjustment mechanism;
   an image pickup element for electrical conversion of light which passed through said optical system;
   an automatic gain control circuit for amplifying an output of said image pickup element to a predetermined value;
   temperature measurement means for detecting a temperature of the element; and
   control means for enlarging an aperture value of said aperture adjustment mechanism when the temperature detected by said temperature measurement means is greater than or equal to a first setup value or, alternatively, less than or equal to a second setup value which is different from the first setup value and which is lower than the first setup value and when a zoom magnification in said manual focus function is greater than or equal to a prespecified magnification, said prespecified magnification is 24× or higher.

2. The zoom camera according to claim 1, wherein said control means has a relation of $X \times A \times S \times F^{-2}$=constant, where F is an aperture value of said aperture adjustment mechanism, A is a gain magnification of the automatic gain control circuit, S is an electronic shutter speed and X is illuminance of a final output image signal, and wherein said control means performs control correlating with the zoom magnification in said manual focus function.

3. The zoom camera according to claim 1, wherein said control means performs control correlating with the detected temperature of said temperature measurement means and an aperture value F of said aperture adjustment mechanism.

4. The zoom camera according to claim 2, wherein said control means performs control correlating with the detected temperature of said temperature measurement means and the aperture value F of said aperture adjustment mechanism.

* * * * *